(12) United States Patent
Haah

(10) Patent No.: US 12,050,965 B2
(45) Date of Patent: Jul. 30, 2024

(54) COMPRESSING DIAGONAL CLIFFORD GATES

(71) Applicant: Microsoft Technology Licensing, LLC, Redmond, WA (US)

(72) Inventor: Jeongwan Haah, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 457 days.

(21) Appl. No.: 17/361,299

(22) Filed: Jun. 28, 2021

(65) Prior Publication Data

US 2022/0414509 A1 Dec. 29, 2022

(51) Int. Cl.
*G06N 10/00* (2022.01)
*G06F 15/16* (2006.01)
*G06N 10/70* (2022.01)

(52) U.S. Cl.
CPC .............. *G06N 10/00* (2019.01); *G06F 15/16* (2013.01)

(58) Field of Classification Search
CPC ......... G06N 10/00; G06N 10/70; G06F 15/16
See application file for complete search history.

(56) References Cited

U.S. PATENT DOCUMENTS

| 2019/0080254 A1 | 3/2019 | Haah et al. | |
|---|---|---|---|
| 2019/0258757 A1* | 8/2019 | Nam | G06N 10/60 |
| 2020/0119748 A1* | 4/2020 | Lucarelli | H03M 13/11 |

OTHER PUBLICATIONS

Trout et al., Magic State Distillation and gate compilation in quantum algorithm for quantum chemistry, Jan. 2015, pp. 1-17 (Year: 2015).*
Tolar, On Clifford groups in quantum computing, 2018, IOP Publishing, pp. 1-12, (Year: 2018).*
Haah, et al., "Measurement Sequences for Magic State Distillation", In Repository of arXiv:2007.07929v3, Jan. 18, 2021, 8 Pages.
"International Search Report and Written Opinion Issued in PCT Application No. PCT/US2022/024317", Mailed Date: Aug. 1, 2022, 19 Pages.
Bravyi, et al., "Magic-State Distillation with Low Overhead", In Repository of arXiv:1209.2426v1, Sep. 11, 2012, 11 Pages.
Bravyi, et al., "Universal Quantum Computation with ideal Clifford gates and noisy ancillas", In Repository of arXiv:quant-ph/0403025v2, Dec. 16, 2004, 15 Pages.
Haah, et al., "Codes and Protocols for Distilling T, controlled-S, and Toffoli Gates", In Repository of arXiv:1709.02832v3, May 30, 2018, 29 Pages.

(Continued)

*Primary Examiner* — Nghia M Doan
(74) *Attorney, Agent, or Firm* — Cantor Colburn LLP; Stephen Wight

(57) ABSTRACT

Embodiments of the present disclosure include systems and methods for magic state distillation. A first matrix is generated based on a collection of indices that reference a second matrix. A set of compressed Clifford gates is determined based on the first matrix. The set of compressed Clifford gates is applied to a set of the qubits of a quantum processor. A set of magic states of the quantum processor are obtained as a result of application of the set of compressed Clifford gates. The quantum processor may be configured based on the magic states obtained.

10 Claims, 8 Drawing Sheets

(56) References Cited

OTHER PUBLICATIONS

Haah, et al., "Magic State Distillation with Low Space Overhead and Optimal Asymptotic Input Count", In Repository of arXiv:1703.07847v1, Mar. 22, 2017, 48 Pages.
Horsman, et al., "Surface Code Quantum Computing by Lattice Surgery", New Journal of Physics 14, Issue 12, Dec. 7, 2012, 28 Pages.
Knill, Emanuel, "Fault-tolerant Postselected Quantum Computation: Schemes", In Repository of arXiv:quant-bh/0402171v1, Feb. 23, 2004, 17 Pages.
Litinski, Daniel, "Magic State Distillation: Not as Costly as You Think", In Repository of arXiv:1905.06903v3, Nov. 6, 2019, 22 Pages.
O'Meara, O.T., "Symplectic Groups", Published by American Mathematical Society, 1978, 125 Pages.
Taylor, Laurence R., "Quadratic Enhancements of Surfaces: Two Vanishing Results", In Proceedings of the American Mathematical Society, vol. 137, Issue 3 , Mar. 2009, pp. 1135-1138.
"International Search Report and Written Opinion Issued in PCT Application No. PCT/US2022/024317", Mailed Date: Aug. 1, 2022, 16 Pages.

\* cited by examiner

COMPRESSING DIAGONAL CLIFFORD GATES

BACKGROUND

The present disclosure relates generally to quantum computing and, more particularly, to quantum circuits that perform magic state distillation protocols.

Quantum decoherence or "noise" remains a significant challenge to the production of large-scale quantum computing systems. Quantum error correction codes can reduce error caused by noise involved in the operations performed by quantum computers. Using Clifford gates in connection with quantum error correction codes can provide a low-error architecture. Unfortunately, it appears impossible to achieve a universal set of quantum gates without using non-Clifford gates, which are challenging to implement in a fault-tolerant way. Fortunately, techniques have been developed that circumvent the use of non-Clifford gates.

One such technique involves producing so-called magic states using only Clifford gates. In this technique, a plurality of magic states having a high error probability are injected into a circuit comprising Clifford gates and a distillation process is performed to distill a subset of higher fidelity magic states. Current solutions for implementing this process, however, are costly and involve a large amount of resources.

DETAILED DESCRIPTION

Figure 1:
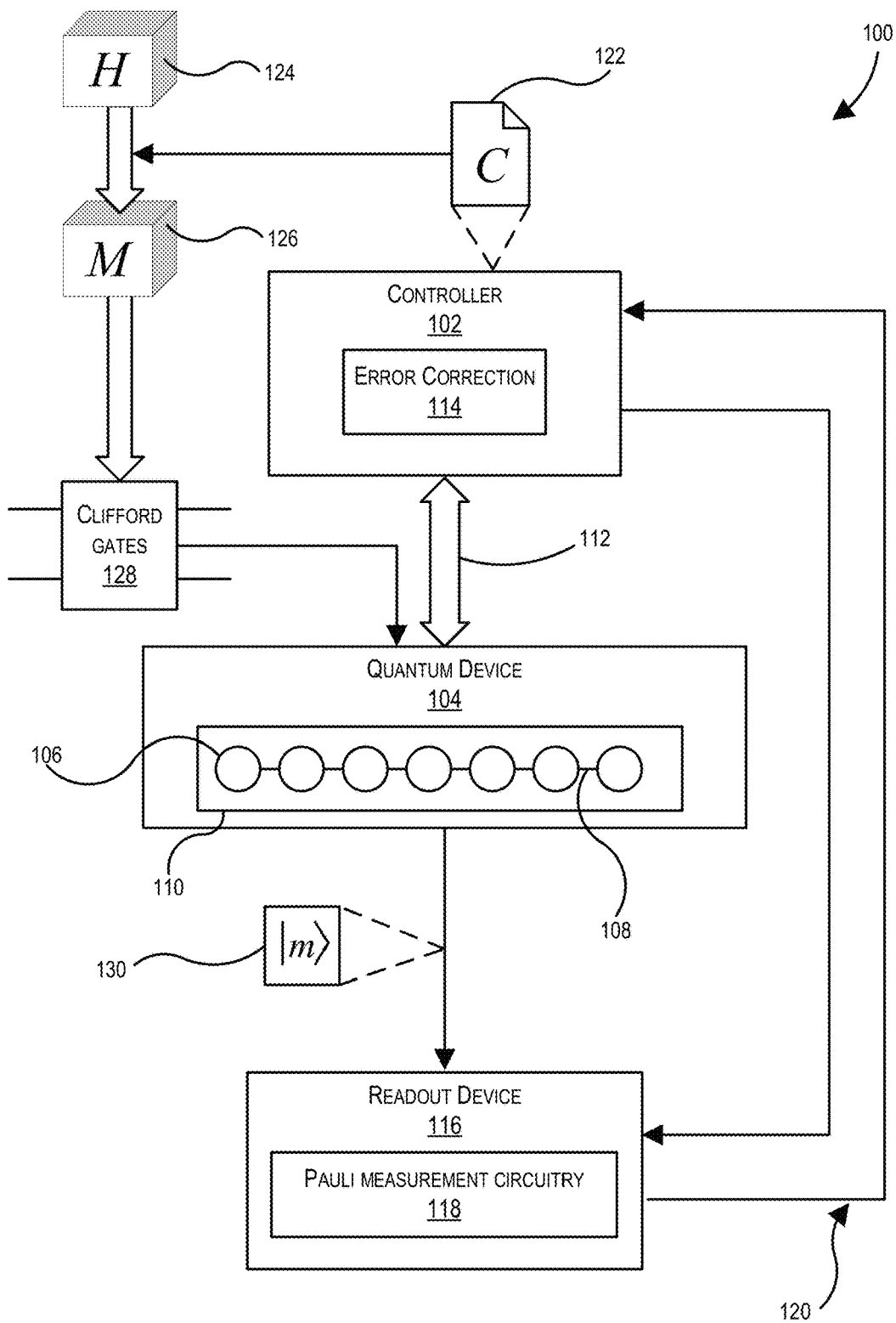
FIG. 1 illustrates an example computer system in which a magic state distillation process is implemented involving a quantum computer and a non-quantum computer according to one or more embodiments.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein. The term "set" (e.g., a set of keys), as used herein, refers to a non-empty collection of members.

Embodiments disclosed herein relate to quantum computing systems and, more specifically, to systems and methods for implementing a family of Clifford circuits for magic state distillation processes. Generally, a magic state distillation process involves: (a) preparing qubits into a set of desired states; (b) injecting a quantum state into one or more qubits; (c) measuring states of the qubits; and (d) performing corrections based on the measured states to obtain so-called magic states of the quantum processor. The operations (b), (c), and (d) may be sequentially repeated using, e.g., various levels or types of corrections based on errors detected in the states measured. The quantum processor may be configured based on the magic states obtained, such as by modifying states of qubits or quantum logic gates, to improve operational fidelity of the quantum processor.

Magic state distillation involves an underlying quantum code and a Clifford correction, and improves the fidelity of magic states to enable universal quantum computation. For each distillation of an input T state in an iteration of magic state distillation, a quantum processor of a quantum computing system waits for classical feedback regarding a set of Clifford gate operations. To execute a given quantum algorithm, the quantum processor waits for tens to hundreds of these instances of classical feedback and each instance of classical feedback typically takes more time than an elementary quantum operation. Embodiments of the present disclosure reduce the number of instances of classical feedback involved to a single instance of classical feedback. Moreover, embodiments disclosed herein reduce the circuit depth of a family of Clifford circuits.

In some embodiments, a T state consumption phase of magic state distillation is performed separately from a Clifford correction phase. The T state consumption phase does not include providing classical feedback to the quantum processor. After all input T states are consumed using teleportation, for example, measurement outcomes are classically processed (e.g., via linear algebra processes executed on a non-quantum computing system), and a compressed Clifford correction is provided to the quantum processor. By separating the T state consumption phase from the Clifford correction phase, the quantum processor waits only once for classical feedback during execution of the entire magic state distillation protocol. By way of contrast, T gate teleportation phases in other implementations can involve an instance of classical feedback every time a T state is consumed, and there are typically many input T states for a given quantum algorithm.

FIG. 1 shows an example quantum computing system 100 configured to perform magic state distillation according to one or more embodiments. The quantum computing system 100 includes a controller 102 that controls and interacts with other parts of the quantum system 100. The controller 102 includes one or more processors and is configured with logic causing the controller 102 to perform as described herein. In some embodiments, the one or more processors of the controller 102 may be operatively coupled to peripheral devices or components, such as input devices (e.g., mouse, keyboard) for receiving user input or network devices that enable remote operation of the controller 102. The one or more processors of the control 102 may take the form of a central processing unit (CPU), a graphics processing unit (GPU), or similar processors.

The controller 102 may comprise classical electronic components or circuitry in at least some embodiments. The terms "classical" and "non-quantum," as used herein, refer to components that can be modeled accurately as a collection of particles without consideration for the quantum state of any individual particle. Non-limiting examples of classical electronic components include integrated circuits, transistors, resistors, and capacitors. The controller 102 may include or otherwise be operatively coupled to memory configured to store program instructions that, as a result of execution by the one or more processors, cause the controller 102 to perform as described herein. The memory associated with the controller 102 may also be configured to hold additional data that influence operation of a quantum processor during run time, such as by providing control input for one or more quantum-gate operations. The controller 102 includes one or more inputs for receiving data or instructions from other devices described herein and includes one or more outputs for providing output data to or controlling other devices described herein. The input(s) and output(s) include analog and/or digital lines.

The quantum system 100 includes a quantum processor 104 that has a plurality of qubits 106 and one or more connections 108 between two or more of the qubits 106. The one or more connections correspond, in some embodiments, to quantum logic gates operating on two or more of the qubits 106. In some embodiments, the plurality of qubits 106 are arranged in a lattice structure (e.g., two-dimensional lattice, three-dimensional lattice) on a substrate 110.

The controller 102 is operatively coupled to the quantum processor 104 via an interface 112. In particular, the controller 102 controls a state of the quantum processor 104 via the interface 112. For instance, using the interface 112, the controller 102 may control quantum states of the qubits 106, may control couplings between the qubits 106 (e.g., which qubits are connected, how qubits are connected), and/or may control an environment of the quantum processor 104 (e.g., temperature, magnetic field). In some embodiments, the controller 102 interacts with the quantum device 104 via the interface 112 to implement a set of desired quantum-gate operations. The controller 102 may also encode an input quantum state into the qubits 106 via the interface 112.

The controller 102 includes circuitry for initializing or preparing a set of states onto a corresponding set of the qubits 106. The controller 102 also includes circuitry for preparing, via the interface 112, quantum logic gates or operations that act on a set of the qubits 106. States of the qubits 106 and the quantum logic gates may be prepared based on user input provided via one or more input devices (not shown) operatively coupled to the controller 102. The controller 102 also includes a state injector 114 for injecting states into the quantum processor 104 via the interface 112. The controller 102 is configured to determine one or more triorthogonal matrices and prepare initial states on a set of the qubits 106 via the interface, wherein the triorthogonal matrix is a binary matrix in which any pair and any triple of rows have even overlap, as discussed in further detail infra. The controller 102 also includes an error correction unit 114 configured to determine corrections to be applied to the quantum processor 104.

In some embodiments, the controller 102 is configured to determine states to be introduced or injected into the quantum processor 104. The controller 102 may include circuitry for preparing the states determined in qubits 106 of the quantum processor 104 via the interface 112. In some embodiments, the controller 102 may introduce states onto ancilla qubits of the quantum processor 104, as described below in further detail. The states introduced into one or more of the qubits 106 may include one or more states of T-states, S-states, and/or so-called magic states. In some embodiments, states introduced into the quantum device 104 may include noise. The controller 102 includes an error correction unit 114 that determines corrections to be applied to the quantum processor 104, as described below.

The quantum computing system 100 also includes a readout device 116 that is configured to measure or read states of the qubits 106 that comprise the quantum processor 104. The controller 102 includes logic for executing quantum algorithms via the interface 112 and for controlling the readout device 116 to measure or read a state of each of the qubits 106. The readout device 116 includes Pauli measurement circuitry 118 configured to perform multibit Pauli measurements, which may be implemented by lattice surgery techniques. In some embodiments, the Pauli measurement circuitry 118, in connection with performing a measurement, includes circuitry for applying quantum logic operations to a set of the qubits 106 and may initialize a set of the qubits 106 (e.g., one or more ancilla qubits) to be in certain states. In some embodiments, the readout device 116 may interact with the controller 102 to perform measurements—for instance, the readout device 116 may send a request to the controller 102 to initialize one or more of the qubits 106 in a defined state in preparation for a Pauli measurement. Although the readout device 116 is shown and described as being separate from the controller 102 with respect to the quantum computing system 100, the controller 102 and readout device 116 may be part of the same device in some embodiments.

The Pauli measurement circuitry 118 may be configured to, in some embodiments, perform one or more quantum logic operations in connection with measurement. For instance, the Pauli measurement circuitry 118 may perform Pauli measurements that involve a tensor product operation. In some embodiments, the Pauli measurement circuitry 118 maps or copies a result of the operation onto a set of ancilla qubits. The readout device 116 includes measurement circuitry configured to measure an eigenvalue of the set of ancilla qubits onto which the results were extracted in some embodiments. The readout device 116 generates, based on a result of the measurements performed, output 120 that is provided to the controller 102.

The error correction unit 114 determines one or more corrections to implement in the quantum processor 104 based on the output 120 received from the readout device 116. The output 120 may specify or indicate that error was present in the measurements obtained by the Pauli measurement circuitry 118. For instance, the output 120 may include a measurement outcome of (−1) for one or more of the qubits 106 measured. The error correction unit 114, in response, may implement a defined correction based on the error detected. Examples of defined corrections include T-state injections and/or S-state injections. In some embodiments, the error correction unit 114 may determine compressed Clifford gates 128 to be applied to a set of the qubits 106. The controller 102 may apply the corrections determined by the error correction unit 114 via the interface 112.

A collection of indices 122 may be generated based on errors detected in one or more Pauli measurements. Each index in the collection of indices 122 references a portion of a first matrix 124 associated with one or more errors detected. The first matrix 124 may correspond to an input state of the quantum device 104 and may be a triorthogonal matrix. The controller 102 generates a second matrix 126 based on the collection of indices 122. In some embodiments, the second matrix 126 may be a symmetric matrix. A set of compressed Clifford gates 128 may be determined based on the second matrix 126 and applied to a set of the qubits 106. Magic states 130 of the quantum processor 104 may be obtained as a result of quantum logic operations performed on the qubits 106 involving the set of compressed Clifford gates 128.

Figure 2:
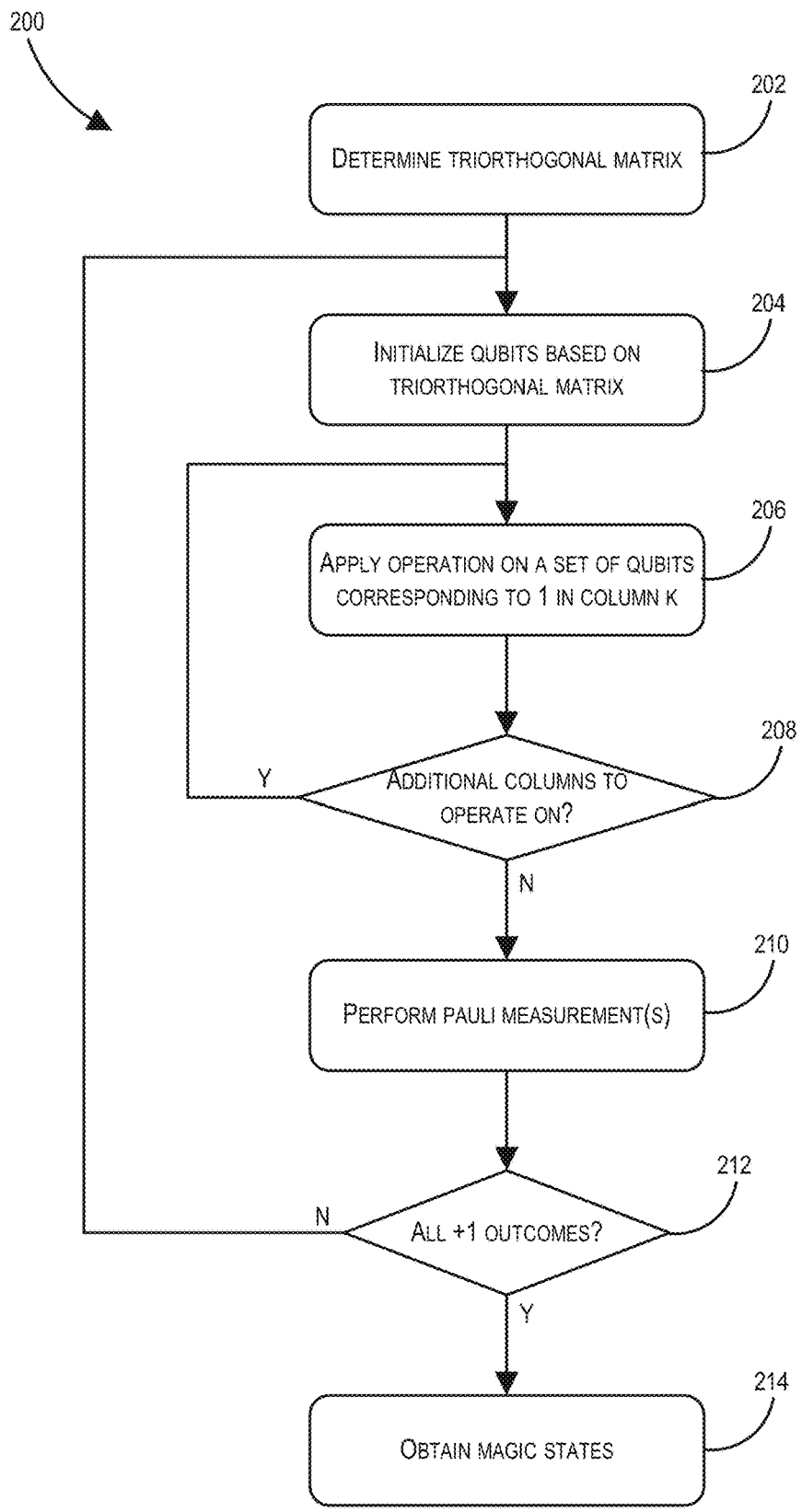
FIG. 2 illustrates a first method for performing magic state distillation by the quantum computing system of FIG. 1 according to one or more embodiments.

FIG. 2 shows a method 200 for performing magic state distillation using the quantum computing system 100 according to one or more embodiments. The method 200 may be performed by the entities described with respect to the quantum computer system 100, which may include additional features not described herein to facilitate performance of a quantum computing algorithm. The method 200 involves T distillation, which is a procedure to improve the fidelity of a quantum state close to the so-called magic state $|0\rangle + e^{i\pi/4}|1\rangle$ using Clifford operations and Pauli measurements. Specially designed error correcting codes are implemented for T distillation and triorthogonal codes are involved in the method 200.

The method 200 includes determining 202 a triorthogonal matrix that is used as a basis for preparing states of the qubits 106. A triorthogonal matrix is a binary matrix in which any pair and any triple of rows have overlap. A binary matrix G of size m-by-n is considered to be triorthogonal if the following conditions are satisfied:

$$\sum_{j=1}^{n} G_{a,j} G_{b,j} = 0 \mod 2,$$

for all pairs of rows $1 \leq a < b \leq m$, and $$\sum_{j=1}^{n} G_{a,j} G_{b,j} G_{c,j} = 0 \mod 2,$$

for all triples of rows $1 \leq a < b < c \leq m$, wherein the first $k_T$ rows of G have odd weight in $\Sigma_{j=1}^{n} G_{a,j} = 1 \mod 2$ for $1 \leq a \leq k_T$ and the remaining rows have even weight in $\Sigma_{j=1}^{n} G_{a,j} = 0 \mod 2$ for $k_T + 1 \leq a \leq n$.

In 202 of the method 200, a triorthogonal binary matrix G is determined that is $(k+g_0)$-by-n as shown in the following Equation 1:

$$G = \begin{pmatrix} (G_1)_{k \times n} \\ (G_0)_{g_0 \times n} \end{pmatrix} \quad [1]$$

wherein the first k rows of the matrix G are a block of odd weight rows and the remaining $g_0$ rows of the matrix G are a block of even weight rows.

In the matrix G, any pair of rows have even overlap and any triple of rows also have even overlap. A Calderbank-Shor-Steane (CSS) code defined by the matrix G facilitates the use of transversal T gates up to a certain Clifford correction, and a T distillation can be implemented to error correct on this CSS code. In the method 200, postselection on a trivial syndrome is implemented rather than classical error correction. There are many circuit implementations possible for a given triorthogonal code; advantageously, the method 200 provides a "space-efficient" circuit. The particular binary values populating the matrix G and the particular size $(k+g_0)$-by-n may be determined based on user input provided via an input device coupled to the controller 102.

The method 200 includes initializing 204 states of a set of the qubits 106 based on the triorthogonal matrix G determined in 202. The controller 102 prepares, via the interface 112, a set of the qubits 106 in quantum states $|+\rangle^{\otimes (k+g_0)}$ based on the matrix G, wherein $g_1 = k$ is the number of rows in $G_1$ and $g_0$ is the number of rows and $G_0$. At 204, the method 200 includes applying, a T gate operation, $e^{(-i\pi Z_k/8)}$, on a set of qubits corresponding to a value of (+1) in the column k of the matrix G. For a T gate operation, $Z_k = Z((G_{jk})_j)$ is the tensor product of Z for each qubit having a state (+1) in column k of the matrix G, where k=1 in the initial iteration and is incremented by one for each successive iteration. The T gate operation $e^{-i\pi Z_k/8}$ may not be an operation that the quantum computing system 100 can perform. As a result, the T gate operation may be achieved by a T state injection, as described with respect to FIG. 3.

The method 200 includes determining, in 208, whether there are additional columns in the matrix G on which to operate. More particularly, the controller 102 determines whether the current column number k is less than or equal to a number n of the matrix G. If so, the current column number k is incremented by one and the method 200 returns to 206 to operate on another set of qubits.

On the other hand, if the current column number k exceeds the number n of the matrix G, the method 200 proceeds to performing, at 210, Pauli measurements on a set of the qubits 106. More particularly, the readout device 116 performs individual Pauli X measurements on a set of qubits corresponding to the rows $g_0$ of the submatrix $G_0$ and a set of Pauli measurement results are obtained. In some implementations, performing the individual Pauli X measurements in 210 may include performing a unitary transformation H on a qubit and measuring a result in a computational basis.

The method 200 further includes determining, at 212, whether all of the individual Pauli X measurements obtained in 210 have a (+1) outcome. If so, the method 200 proceeds to obtaining, at 214, magic states for the quantum processor 104. More specifically, the magic states obtained in 214 are in the first k qubits that correspond to the rows of the submatrix $G_1$. In 214, the magic states obtained are used to implement a quantum algorithm on the quantum computing system 100. If, in 212, all of the individual Pauli X measurements obtained in 210 do not have a (+1) outcome, then the method 200 returns to reinitialize, in 204, a set of qubits based on the triorthogonal matrix G determined in 202.

Figure 3:
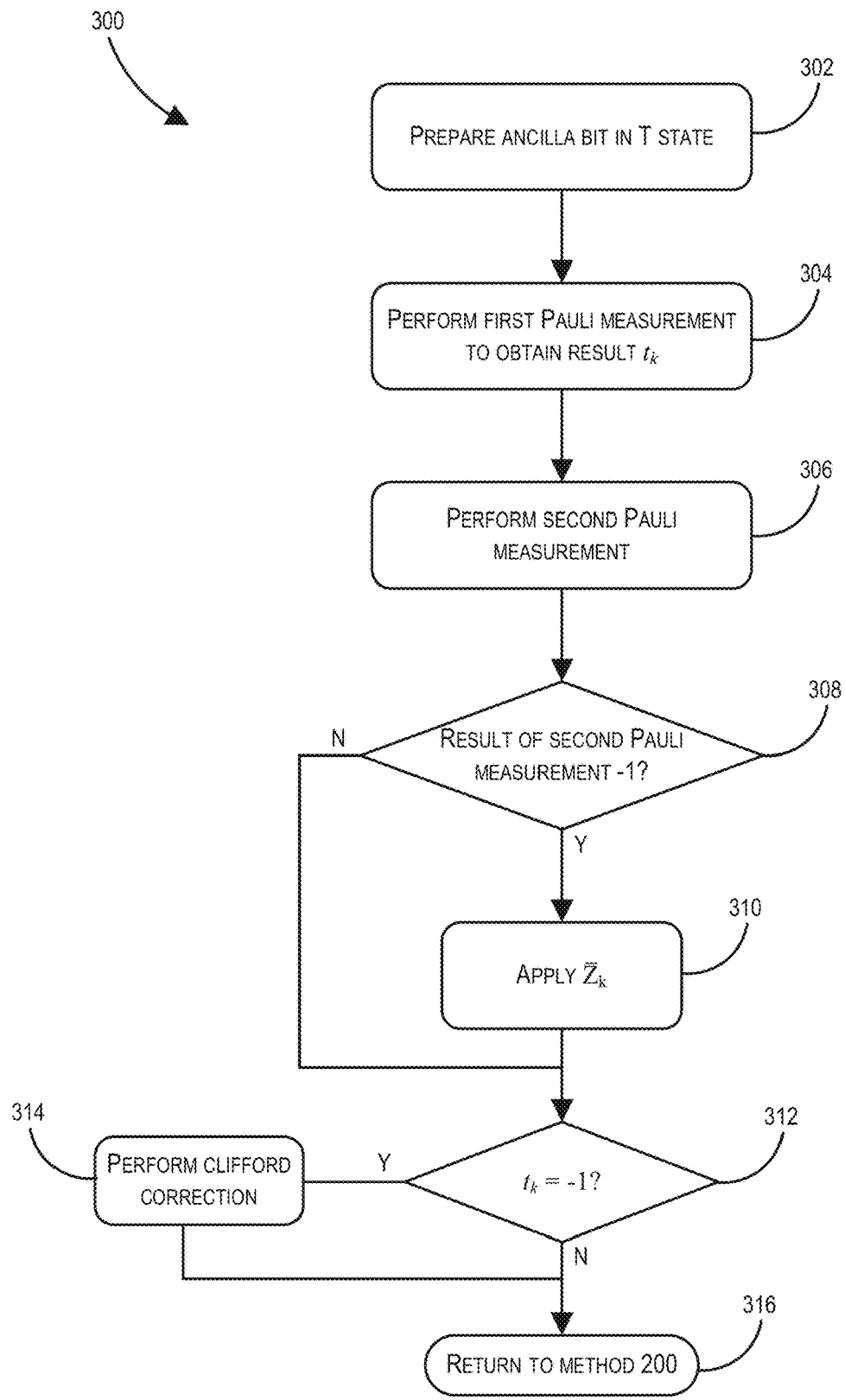
FIG. 3 illustrates a method for performing a T state injection involving a measurement sequence according to one or more embodiments.

FIG. 3 illustrates a method 300 for performing a T state injection involving a measurement sequence according to one or more embodiments. The method 300 may be performed as a part of applying the operation on a set of qubits in 206 of the method 200. The method 300 includes preparing, at 302, an ancilla qubit in a T state $|0\rangle + e^{i\pi/4}|1\rangle$. In some embodiments, the ancilla qubit may include noise and can be provided by an earlier round of T distillation. The method 300 includes performing, at 304, a first Pauli measurement involving the ancilla qubit to obtain a result $t_k$, which has a value of (+1) or (−1). More particularly, a Pauli measurement $Z_{ancilla} \otimes Z_k$ is performed, wherein $Z_k = Z((G_{jk})_j)$, as discussed with respect to FIG. 2. The Pauli measurement $Z_{ancilla} \perp Z_k$ is a multiqubit Pauli measurement that, in some embodiments, is implemented via lattice surgery techniques.

In a lattice surgery architecture, application of a Pauli operator is passive and does not correspond to any action on the quantum processor 104. The controller 102 may track which Pauli frame a particular qubit is in and interpret any measurement outcome in the Pauli frame. The measurement-outcome dependent Pauli operator does not require any classical feedback.

The method 300 includes performing, at 306, a second Pauli measurement $X_{ancilla}$. The second Pauli measurement $X_{ancilla}$ is a single qubit Pauli measurement of an ancilla qubit. At 308, the method 300 includes determining whether the outcome of the Pauli measurement $X_{ancilla}$ performed at 306 is −1. If the result of the Pauli measurement $X_{ancilla}$ performed at 306 is −1, the method 300 proceeds to apply $\bar{Z}_k$ at 310. As described with respect to the method 200, applying $\bar{Z}_k$ involves a tensor product of the Pauli matrix Z for each qubit having a state (+1) in column k of the matrix G.

If the result of the Pauli measurement $X_{ancilla}$ performed at 306 is not −1 or as a result of applying $\bar{Z}_k$ at 310, the method 300 proceeds to determining, at 312, whether the result $t_k$ obtained at 304 is −1. If the result $t_k$ is −1, the method 300 includes performing a Clifford correction at 314. More particularly, performing the Clifford correction at 314 includes applying $e^{-i\pi \bar{Z}_k/4}$. In some embodiments, performing the Clifford correction involves performing an S injection according to the method described with respect to FIG. 4 discussed infra. At the conclusion of performing the Clifford correction at 314 or if the result $t_k$ is not −1, the method 300 proceeds to return, at 316, to performance of the method 200. It is observed that the ancilla qubit in the method 300 is measured before the Clifford correction, so the ancilla qubit may be reused.

Figure 4:
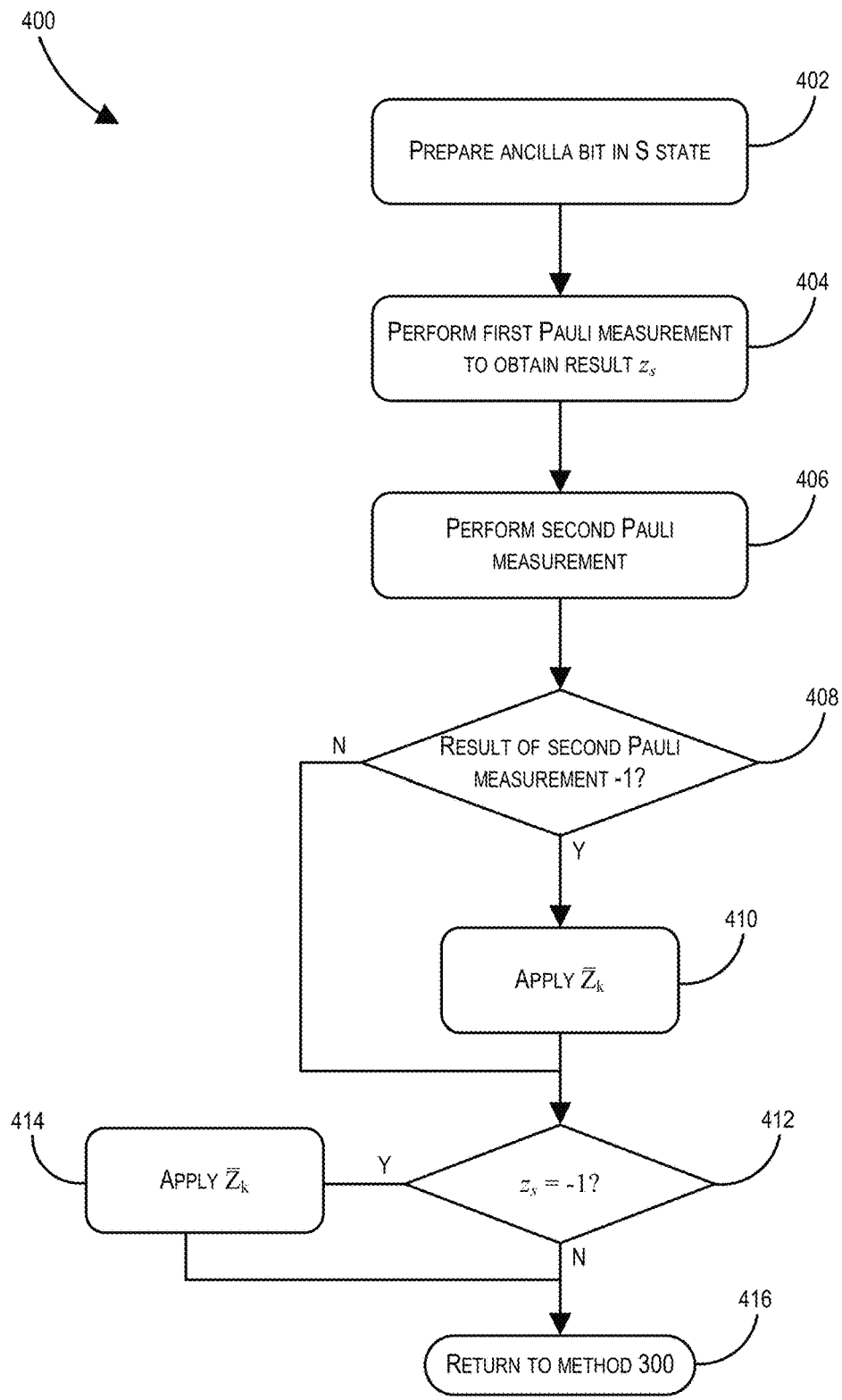
FIG. 4 illustrates a method for performing an S state injection according to one or more embodiments.

FIG. 4 illustrates a method 400 of performing an S injection according to one or more embodiments. The method 400 may be performed in connection with performing a Clifford correction in 314 of the method 300. The method 400 includes preparing, at 402, an ancilla qubit in an S state |0⟩ +i|1⟩ . The method 400 also includes performing, at 404, a first Pauli measurement involving the ancilla qubit to obtain a result $z_s$, which has a value of (+1) or (−1). More particularly, a Pauli measurement $Z_{ancilla} \otimes \bar{Z}_k$ is performed, wherein $\bar{Z}_k = Z((G_{jk})_j)$, as discussed with respect to FIG. 2. The Pauli measurement $Z_{ancilla} \otimes \bar{Z}_k$ is a multiqubit Pauli measurement that, in some embodiments, is implemented via lattice surgery techniques.

The method 400 includes performing, at 406, a second Pauli measurement $X_{ancilla}$. The second Pauli measurement $X_{ancilla}$ is a multiqubit Pauli measurement that is, in some embodiments, implemented by lattice surgery techniques. At 408, the method 400 includes determining whether the outcome of the Pauli measurement $X_{ancilla}$ performed at 406 is −1. If the result of the Pauli measurement $X_{ancilla}$ performed at 406 is −1, the method 400 proceeds to apply $\bar{Z}_k$ at 410. As described with respect to the method 200, applying $\bar{Z}_k$ involves a tensor product of the Pauli matrix Z for each qubit having a state (+1) in column k of the matrix G.

If the result of the Pauli measurement $X_{ancilla}$ performed at 406 is not −1 or as a result of applying $\bar{Z}_k$ at 410, the method 400 proceeds to determining, at 412, whether the result $z_s$ obtained at 404 is −1. If the result $z_s$ is −1, the method 400 includes applying $\bar{Z}_k$ at 414, which involves a tensor product of the Pauli matrix Z for each qubit having a state (+1) in column k of the matrix G. At the conclusion of performing the Clifford correction at 414 or if the result $z_s$ is +1, the method 400 proceeds to return, at 416, to performance of the method 300.

In the absence of any noise, the measurement outcome of $z_s = -1$ is obtained with a probability of 1/2. Hence, a Clifford correction is needed with probability 1/2, and the total number of Clifford corrections in the method 200 follows a binomial distribution B(n, 1/2), wherein n is the number of columns in the matrix G. In the presence of some noise in the quantum processor 104, the measurement outcome distribution can be biased, but the results of the method 200 may still be stochastic. A stochastic process is less favorable than a fully deterministic process because it is difficult to synchronize operations across the quantum processor 104.

Performance of the method 200 involves a plurality of Clifford corrections, each Clifford correction involving an instance of classical feedback in which n bits are to be determined, n being the number of columns of G. For example, to perform a Clifford correction in 314 of the method 300, the controller 102 receives results of a set of measurements of a set of the qubits 106 and performs one or more operations affecting a state of one or more of the qubits 106. Each instance of classical feedback takes a non-trivial amount of time to perform, prolonging overall execution of the overall magic state distillation process.

Figure 5:
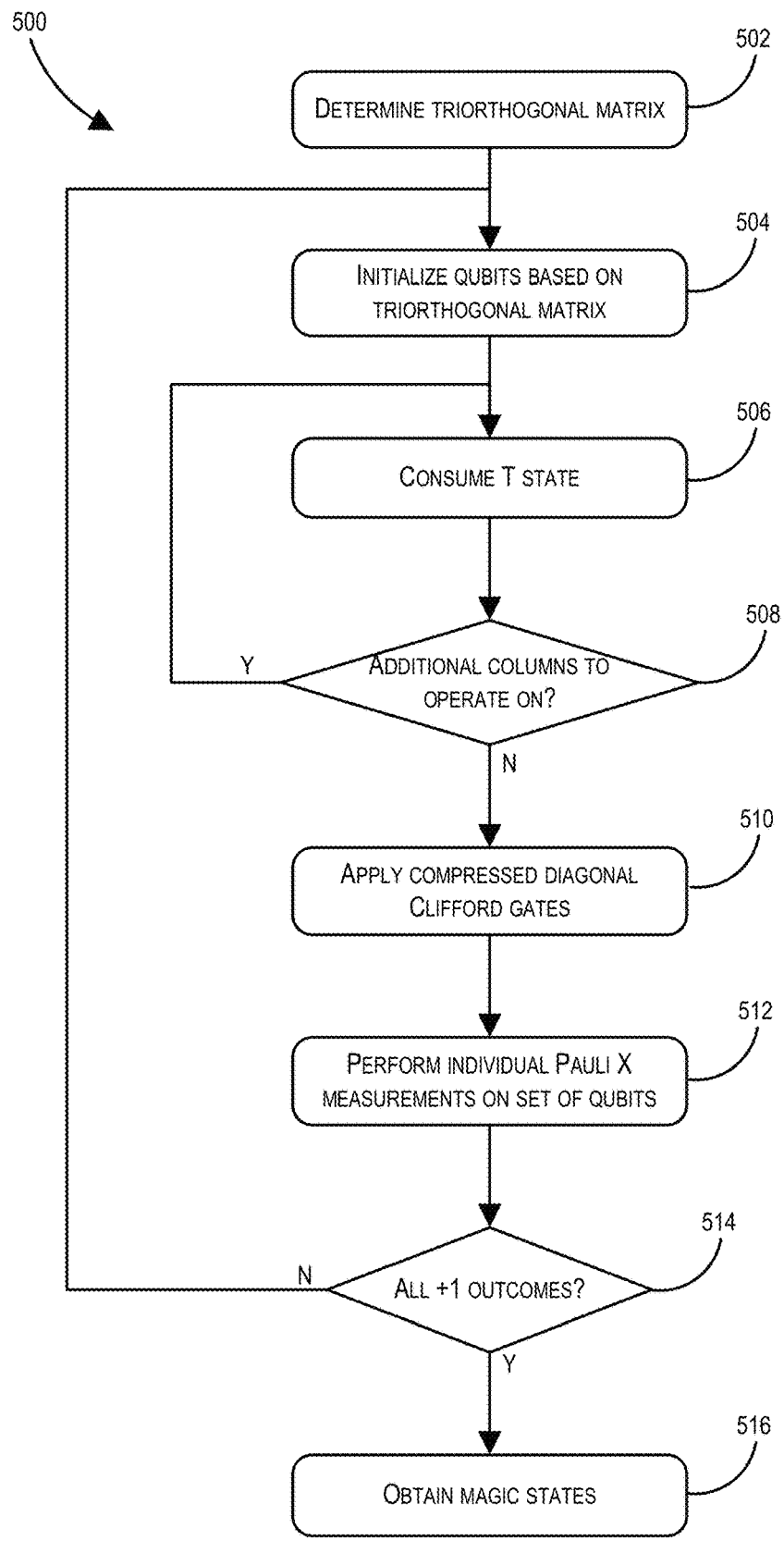
FIG. 5 illustrates a second method for performing magic state distillation by the quantum computing system of FIG. 1 according to one or more embodiments.

FIG. 5 shows a method 500 for performing magic state distillation using the quantum computing system 100 according to one or more embodiments. Portions of the method 500 include representing a product of diagonal Clifford gates as a quadratic form, determining a set of compressed diagonal Clifford gates based on the quadratic form, and inducing the quadratic form using the set of compressed diagonal Clifford gates. In the method 500, the Clifford corrections are delayed until all the input T states are consumed, and the Clifford corrections are collectively applied in a single instance of classical feedback to a set of the qubits 106. The single instance of classical feedback, for example, may involve collectively performing a set of Clifford corrections on a set of the qubits 106 subsequent to consumption of all of the T states. The single instance of classical feedback may involve successive applications of Clifford corrections (e.g., using Clifford gates) without intervening measurements on the qubits 106. In some embodiments, the set of Clifford corrections include collectively applying a set of compressed diagonal Clifford gates to a set of the qubits 106.

The delay of Clifford corrections is possible because any operation on data qubits of the qubits 106 correspond to the rows of G that are diagonal in the Z basis, the data qubits being utilized in the S injections. As a result, a significant time savings is achieved in performing magic state distillation. Moreover, the upper bound of the binomial distribution B is lowered from n—the number of columns of the matrix G—to $k+g_0$—the number of rows of the matrix G, thereby reducing the stochastic nature of the magic state distillation process.

The method 500 includes determining, at 502, a triorthogonal matrix that is used as a basis for preparing states of the qubits 106. In particular, the triorthogonal binary matrix G in Equation 1, the matrix G being an $(k+g_0)$-by-n triorthogonal binary matrix. The method 500 further includes initializing, at 504, states of a set of the qubits 106 based on the triorthogonal matrix G determined in 502. The controller 102 prepares, via the interface 112, a set of the qubits 106 in quantum states $|+\rangle^{\otimes(k+g_0)}$ based on the matrix G, wherein $|+\rangle^{\otimes(k+g_0)}$, wherein $g_1 = k$ is the number of rows in the submatrix $G_1$ and $g_0$ is the number of rows in the submatrix $G_0$.

Figure 6:
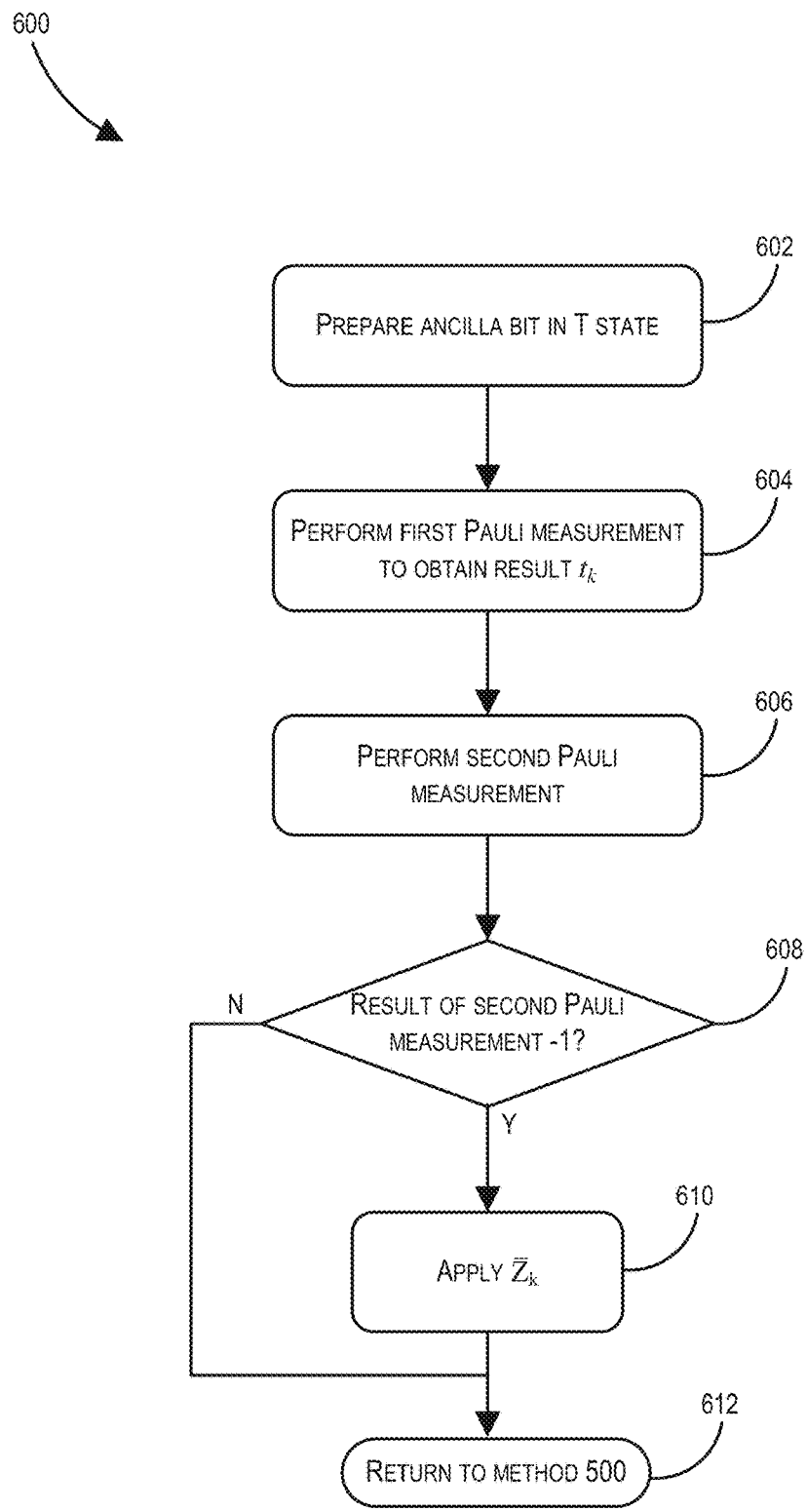
FIG. 6 illustrates a method for performing a T state injection involving a measurement sequence according to one or more embodiments.

The method 500 further includes performing, at 506, a T state injection. FIG. 6 shows a method 600 for performing a T state injection involving a measurement sequence according to one or more embodiments. The method 600 is performed at 506 of the method 500 and involves, at least in part, a set of qubits corresponding to the submatrix $G_1$. The method 600 includes some features substantially similar to the method 300, so description thereof is limited for brevity. The method 600 includes preparing, at 602, an ancilla qubit in a T state $|0\rangle + e^{i\pi/4}|1\rangle$, which may include possible noise.

The method 600 includes performing, at 604, a first Pauli measurement, $Z_{ancilla} \otimes \bar{Z}_k$, involving the ancilla qubit to obtain a result $t_k$, which has a value of (+1) or (−1). The first Pauli measurement, $Z_{ancilla} \otimes \bar{Z}_k$ may be a multiqubit Pauli measurement that obtains a measurement involving a plurality of the qubits 106, which are data qubits as opposed to ancilla qubits. In 604 of the method 600, each index k for which the result $t_k$ is (−1) is tracked by the controller 102. For instance, the controller 102 may store a collection C of indices (e.g., an array) in data storage in which the entries correspond to the indices k that have a result $t_k$ of (−1) or that do not have a result $t_k$ of (+1). An index k references a portion of the matrix G (e.g., a column) that corresponds to a set of the qubits 106 for which a result $t_k$ was obtained that includes (−1) or that does not include (+1).

The method 600 includes performing, at 606, a second Pauli measurement $X_{ancilla}$ on the ancilla qubit, which is a Pauli X measurement on the ancilla qubit. At 608, the method 600 includes determining whether the outcome of the Pauli measurement $X_{ancilla}$ performed at 606 is −1. If the result of the Pauli measurement $X_{ancilla}$ performed at 606 is −1, the method 600 proceeds to apply $\bar{Z}_k$ at 610. As a result of applying $\bar{Z}_k$ at 610 or if the result of the second Pauli measurement $X_{ancilla}$ is not −1, the method 600 returns, at 612, to performance of the method 500.

Returning to FIG. 5, the method 500 includes determining, at 508, whether there are additional columns in the matrix G on which to operate. More particularly, the controller 102 determines whether the current column number k is less than or equal to a number n of the matrix G. If so, the current column number k is incremented by one and the method 500 returns to 506 to operate on another set of qubits. If it is determined, at 508, that there are additional columns in the matrix G on which to operate, then the method 500 proceeds to applying, at 510, compressed diagonal Clifford gates, as described below with respect to FIG. 7.

The method 500 further includes performing, at 512, individual Pauli X measurements on a set of qubits. More specifically, individual Pauli X measurements are obtained on a set of qubits corresponding to the last $g_0$ rows of the submatrix $G_0$. Then, at 514, the method includes determining whether the results of all the individual Pauli X measurements obtained in 512 have a (+1) outcome. If so, the method 500 proceeds to obtaining, at 516, magic states for the quantum processor 104. More specifically, the magic states obtained in 516 are in the first k qubits that correspond to the rows of the submatrix $G_1$. The magic states obtained in 516 are used to implement a quantum algorithm on the quantum computing system 100. If, in 514, all the individual Pauli X measurements obtained in 510 do not have a (+1) outcome, then the method 500 returns to reinitialize, in 504, a set of qubits based on the triorthogonal matrix G determined in 502.

Figure 7:
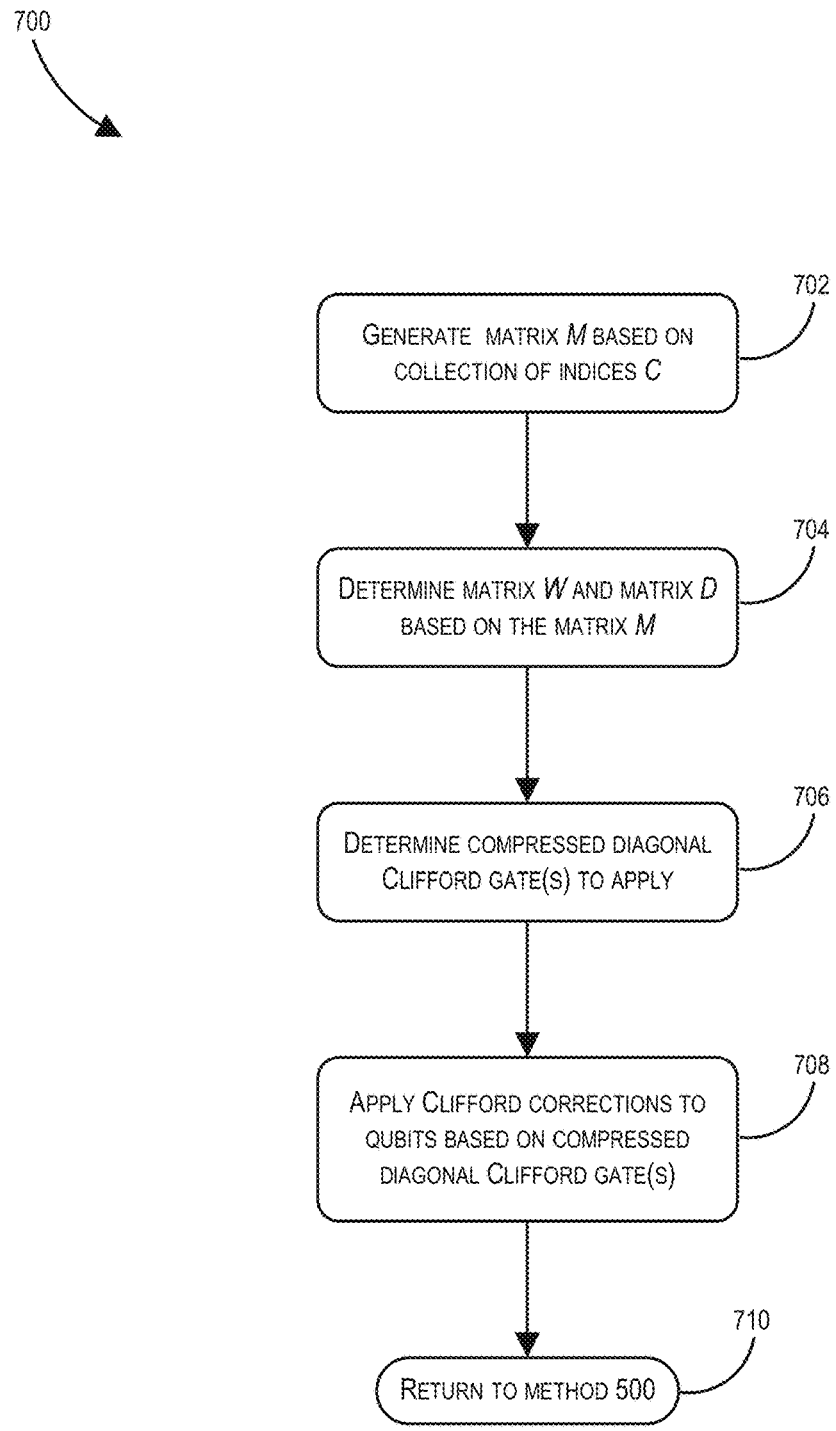
FIG. 7 illustrates a method for applying a set of compressed diagonal Clifford gates to a set of qubits according to one or more embodiments.

FIG. 7 shows a method 700 of applying a set of compressed diagonal Clifford gates to a set of the qubits 106 according to one or more embodiments. In the method 500, the Clifford corrections are delayed until all input T states are consumed and all the outcomes $z_k$ for k=1, 2, ..., n, are collected. Then, at 510, the method 700 is performed which involves applying the delayed Clifford corrections in the form of compressed diagonal Clifford gates to a set of qubits for which the result $t_k$ is −1, wherein the indices k are columns of the matrix G. In particular, the set of qubits to which diagonal Clifford gates are applied are those corresponding to the rows of the matrix G in the collection C of indices. A diagonal Clifford gate, as referred to herein, is shown generally by the following Equation 2:

$$S(V) = \prod_{v \in V} \exp\left(\frac{i\pi}{4} - \frac{i\pi}{4}Z(v)\right) \qquad [2]$$

wherein $Z = |0\rangle\langle 0| - |1\rangle\langle 1|$ is the standard Pauli Z matrix, visa binary vector $v = (v_1, \ldots, v_m) \in \mathbb{F}_2^m$, v ranges over some set $V \subseteq \mathbb{F}_2^m$, and Z(v) is the tensor product $$Z(v) = \bigotimes_{j=1}^{m} Z^{v_j}$$

of Z and the identity matrices. Because Pauli Z is a diagonal matrix, any two diagonal Clifford gates commute with each other, so the product is unambiguous. The set of all diagonal Clifford gates includes the S gate and the control-Z (CZ) gate.

The diagonal Clifford gate S(V) can be modified to a different form based on the relationship x mod 2=$x^2$ mod 4. That is, consider a matrix $V = (V_{ab})$ over $\mathbb{F}_2$, wherein the rows are vectors in the set $V \subseteq \mathbb{F}_2^m$, and the matrix V is a matrix that can be compressed and implemented in a set of compressed diagonal Clifford gates. However, the method 700 involves determining the matrix V based on the matrix G.

The method 700 includes generating, at 702, a matrix M based on the collection of indices C determined in the method 500. In particular, generating in 702 includes generating a matrix H that is a submatrix of the matrix G described with respect to FIG. 5 and elsewhere herein. The matrix H is generated by inserting the columns of the matrix G that are specified in the collection C of indices. An asymmetric matrix V is obtained by taking the transpose of the matrix H—specifically, $V = H^T$. A symmetric matrix M over $\mathbb{Z}_4$ is related to V and is obtained based on the relationship $M = V^T V$, which is viewed as a function q: $\mathbb{F}_2^m \to \mathbb{Z}_4$ by $q(z) = zMz^T$.

The method 700 also includes determining, at 704, a matrix W and a matrix D based on the matrix M. The matrices W and D are determined based on the following proposition: For any $\mathbb{Z}_4$-valued quadratic form q: $\mathbb{F}_2^m \to \mathbb{Z}_4$, there exists an r-by-m matrix W and an m-by-m diagonal matrix D, both over $\mathbb{F}_2$, such that a quadratic form q is by $W^T W + 2 \cdot D$ and $r_0 \leq r \leq r_0 + 1$, $r_0 = \text{rank}_{\mathbb{F}_2}(q)$. A quadratic form q by M corresponds to q: $z \mapsto zMz^T \in \mathbb{Z}_4$, where z is a vector over $\mathbb{F}_2$. For the quadratic form q by $W^T W + 2 \cdot D$, $2 \cdot: \mathbb{F}_2 \to \mathbb{Z}_4$ is a standard additive group embedding. In 702 and 704 of the method 700, a product of diagonal Clifford gates (e.g., in Equation 2) is represented as a quadratic form.

The matrix W may be determined in 704 based on the relationship $W^T W = M$ mod 2 and working over $\mathbb{F}_2$. In some embodiments, the matrix W may be determined given the matrix M using a variant of Gaussian elimination, wherein the computational complexity is to $O(m^3)$, where m is the number of columns of the matrix W. In some embodiments, the procedure to find the matrix W depends on whether the matrix M has a (+1) in the diagonal. If the matrix M has a (+1) in the diagonal, then an invertible matrix E is determined such that $E^{-T} M E^{-1}$ is a diagonal matrix. Over $\mathbb{F}_2$, a diagonal matrix is an identity matrix I with one or more trailing zeros in the diagonal. As a result, the matrix $$M = E^T \begin{pmatrix} I_{r_0} & 0 \\ 0 & 0 \end{pmatrix} E.$$

The matrix W with $r_0$ rows is determined using only the first row $r_0$ of the matrix E.

If the diagonal of the matrix M is all zeros, then a matrix $$M' = \begin{pmatrix} 1 & 0 \\ 0 & M \end{pmatrix}$$

is used that is one-larger than the matrix M The matrix W' may then be determined using an invertible matrix E such that $E^{-T}M'E^{-1}$ is a diagonal matrix. As a result, the matrix $$M' = E^T \begin{pmatrix} I_{r_0} & 0 \\ 0 & 0 \end{pmatrix} E.$$

The matrix W with $r_0$ rows is determined using only the first row $r_0$ of the matrix E and by removing the first column of the matrix W'. The number of rows of the matrix W is $r_0+1$.

As a result of finding the matrix W, the diagonal matrix D is determined from based on the relationship $W^T W = M$ mod 2. In particular, the diagonal matrix D corresponds to the diagonal entries of $M - W^T W$ mod 4.

The method 700 also includes determining, at 706, a set of compressed diagonal Clifford gates to be used based on the matrices W and D. The diagonal Clifford gates S(V) of Equation 2 can be expressed in terms of the matrices W and D, which have a cardinality smaller than the matrix V. More specifically, the diagonal Clifford gate can be expressed in terms of a compressed diagonal Clifford gate, as shown in the following Equation 3:

$$S(V) = S(W)Z(\text{diag}(D)) \quad [3]$$

wherein S(W) is the compressed diagonal Clifford gate and corresponds to Equation 2 represented in terms of the matrix W, and Z(diag(D)) is a tensor product of the Pauli Z matrix and a vector comprising the diagonal entries of the matrix D. In 706 of the method 700, a set of compressed diagonal Clifford gates are represented in a quadratic form.

The method 700 further includes applying, at 708, the set of compressed diagonal Clifford gates determined in 706. Applying the compressed diagonal Clifford gates S(W) includes at most m+1 rotation gates, wherein m is the number of columns, whereas S(V) contains a number |V| rotation gates which can be exponentially large in m. The diagonal Clifford gates S(W)Z(diag(D)) are applied by the controller 102 on a set of the qubits 106 corresponding to the collection of indices C. The controller 102 may apply the diagonal Clifford gates S(W)Z(diag(D)) as a series of quantum state injections. The method 700 concludes at 710 and the method 500 is resumed at 512.

As a result of the method 700, the diagonal Clifford gates can be implemented by at most $k+g_0+1$ injections or operations, which is significantly fewer than previously implemented solutions which include at least n operations, wherein $k+g_0$ is the number of rows of the matrix G and n is the number of columns of the matrix G. In known triorthogonal matrices, $k+g_0+1 < n$. For example, in a 15-to-1 distillation protocol, $k+g_0+1=6$ whereas n=15. As another example, in a 116-to-12 distillation protocol, $k+g_0+1=30$, and n=116. Therefore, the number of operations and time consumed by the quantum state operations is significantly reduced.

The following descriptions may clarify development of the compressed form of S(V) in Equation 3 relative to the diagonal Clifford gates S(V) of Equation 2. Consider $\mathbb{F}_2$ as being a subset of $\mathbb{Z}$ and let $V=(V_{ab})$ be the matrix over $\mathbb{F}_2$ whose rows are vectors in the set $V \subseteq \mathbb{F}_2^m$. Then, for an arbitrary computational basis state $|z\rangle = |z_1, \ldots, z_m\rangle$ where $z_j \in \mathbb{F}_2$, the diagonal Clifford gate S(V) can be modified or reduced as shown in the following Equation 4:

$$S(V)|z\rangle = \prod_a \exp\left(\frac{i\pi}{4} - \frac{i\pi}{4}\prod_b (-1)^{V_{ab}z_b}\right)|z\rangle \quad [4]$$

$$= |z\rangle \prod_a \exp\left[\frac{i\pi}{2}\left(\sum_b V_{ab}z_b \bmod 2\right)\right]$$

$$= |z\rangle \exp\left[\sum_a \frac{i\pi}{2}\left(\sum_b V_{ab}z_b\right)^2\right]$$

$$= |z\rangle \exp\left[\frac{i\pi}{2}\sum_{a,b,c} V_{ab}z_b V_{ac}z_c\right]$$

$$= |z\rangle \exp\left[\frac{i\pi}{2} z V^T V z^T\right]$$

wherein the representation shown in the last line of Equation 4 uses a vector-matrix notation in which z is a row vector. The matrix V is an asymmetric matrix in which the number of rows is different than the number of columns. However, the expression in the exponential implies that the action of the diagonal Clifford gate S(V) is determined by a symmetric matrix M over $\mathbb{Z}_4$ having the form $M = V^T V$, which is viewed as a function $q: \mathbb{F}_2^m \to \mathbb{Z}_4$ by $q(z) = zMz^T$.

By the proposition discussed with respect to 704 of the method 700, any such quadratic function q can be realized by a matrix W with m+1 or less rows and a diagonal matrix D according to the following Equation 5:

$$q(z) = z(W^T W)z^T + 2 \cdot zDz^T \quad [5]$$

As described herein, the quadratic form q(z) can be induced using the set of compressed diagonal Clifford gates. The diagonal matrix $2 \cdot D$ corresponds to $S(D)^2$ which is a tensor product of Pauli matrix Z. For example, the diagonal matrix $S(D)^2$ can be expressed according to the following Equation 6, which is a Pauli operator:

$$S(V)^2 = \prod_v \exp\left(\frac{i\pi}{2} - \frac{i\pi}{2}Z(v)\right) = \prod_{v \in V} Z(v) \quad [6]$$

According to the foregoing description, the stochastic nature of the process may be reduced, and the number of Clifford correction is upper bounded by $k+g_0+1$, which is a smaller number than n. Furthermore, classical feedback is implemented in the method 500 only a single time, whereas classical feedback may be implemented n times in a sequence between 208 and 210 of the method 200.

In some implementations, the triorthogonal code may utilize T and T† gates to induce logical T gates. Then, some Clifford correction $e^{-i\pi Z_k/4}$ may be called in connection with $t_k=+1$ rather than $t_k=-1$. The method 500 may be implemented in such situations by setting the matrix V as the collection of all S-corrections to be performed.

Figure 8:
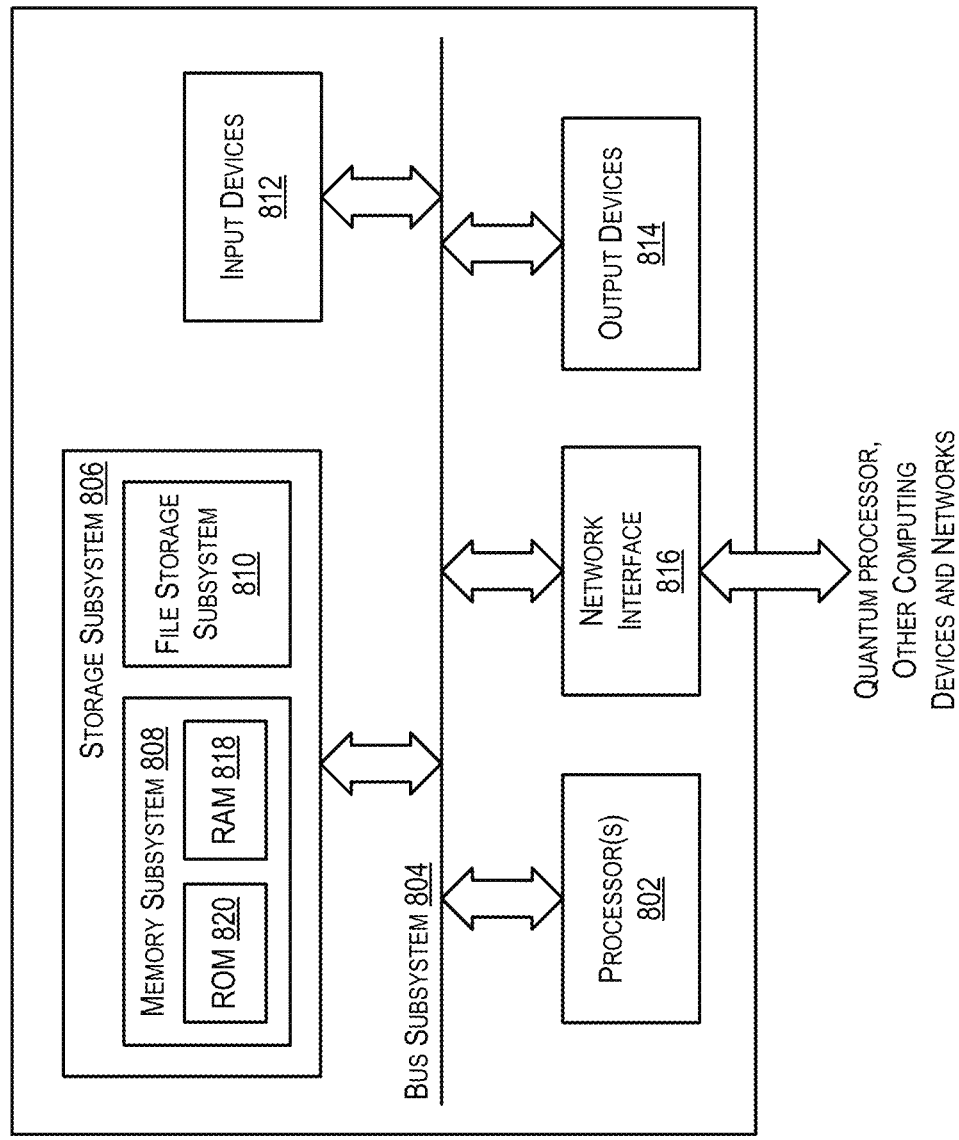
FIG. 8 illustrates a illustrates an artificial neural network processing system according to one or more embodiments.

FIG. 8 depicts a simplified block diagram of an example computer system 800 according to certain embodiments. Computer system 800 can be used to implement any of the computing devices, systems, or servers described in the foregoing disclosure. As shown in FIG. 8, computer system 800 includes one or more processors 802 that communicate with a number of peripheral devices via a bus subsystem 804. These peripheral devices include a storage subsystem 806 (comprising a memory subsystem 808 and a file storage subsystem 180), user interface input devices 812, user interface output devices 814, and a network interface subsystem 816.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computer systems or networks. Embodiments of network interface subsystem 816 can include, e.g., an Ethernet card, a Wi-Fi and/or cellular adapter, a modem (telephone, satellite, cable, ISDN, etc.), digital subscriber line (DSL) units, and/or the like.

User interface input devices 812 can include a keyboard, pointing devices (e.g., mouse, trackball, touchpad, etc.), a touchscreen incorporated into a display, audio input devices (e.g., voice recognition systems, microphones, etc.) and other types of input devices. In general, use of the term "input device" is intended to include all possible types of devices and mechanisms for inputting information into computer system 800.

User interface output devices 814 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 800.

Storage subsystem 806 includes a memory subsystem 808 and a file/disk storage subsystem 810. Subsystems 818 and 820 represent non-transitory computer-readable storage media that can store program code and/or data that provide the functionality of embodiments of the present disclosure.

Memory subsystem 808 includes a number of memories including a main random-access memory (RAM) 818 for storage of instructions and data during program execution and a read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

Further Example Embodiments

In various embodiments herein, the present disclosure includes systems, methods, and apparatuses for performing magic state distillation using compressed Clifford gates. The techniques described herein may be embodied in non-transitory machine-readable medium storing a program executable by a computer system, the program comprising sets of instructions for performing as described herein. In some embodiments, a system includes one or more processors and a non-transitory machine-readable medium storing instructions that when executed by at least one of the one or more processors cause at least one of the one or more processors to perform as described herein. In some embodiments, the non-transitory machine-readable medium may be memory, for example, which may be coupled to the aforementioned one or more processors, for example.

The following techniques may be embodied alone or in different combinations and may further be embodied with other techniques described herein.

In some embodiments, for example, the present disclosure includes a computer system comprising a quantum processor including a plurality of qubits; one or more non-quantum processors; and a non-transitory computer readable medium having stored thereon program code executable by the one or more non-quantum processors. The program code causing the one or more non-quantum processors to generate a first matrix based on a collection of indices that reference a second matrix; determine a set of compressed Clifford gates based on the first matrix; apply the set of compressed Clifford gates to a first set of the qubits; and obtain a set of magic states of the quantum processor as a result of the set of compressed Clifford gates being applied, thereby reducing a number of classical feedback instances involved in magic state distillation.

In some embodiments, execution of the program code causes the one or more non-quantum processors to perform a multiqubit Pauli measurement on the plurality of qubits to obtain first Pauli measurement results; and update the collection of indices based on the multiqubit Pauli measurement results.

In some embodiments, execution of the program code causes the one or more non-quantum processors to perform a set of Pauli measurements on a second set of the qubits to obtain a set of Pauli measurement results; determine that the set of Pauli measurement results include a defined value; and update the collection of indices to include an index referencing a portion of the second matrix.

In some embodiments, execution of the program code causes the one or more non-quantum processors to generate a third matrix and a fourth matrix based on the first matrix, wherein the set of compressed Clifford gates is determined based on the third matrix and the fourth matrix.

In some embodiments, execution of the program code causes the one or more non-quantum processors to represent a product of diagonal Clifford gates in a quadratic form based on the collection of indices; and induce the quadratic form to determine the set of compressed Clifford gates using a third matrix and a fourth matrix generated based on the first matrix.

In some embodiments, execution of the program code causes the one or more non-quantum processors to perform a plurality of Pauli measurements to obtain a plurality of Pauli measurement results; and inject a set of T states on a set of the qubits, wherein the set of compressed Clifford gates are applied subsequent to consumption of the set of T states.

In some embodiments, the first matrix is a symmetric matrix that is generated based on an asymmetric matrix. In some embodiments, the set of compressed Clifford gates includes a set of compressed diagonal Clifford gates. In some embodiments, the set of compressed Clifford gates are collectively applied in a single instance of classical feedback on the first set of the plurality of qubits.

The present disclosure further includes a method comprising generating a first matrix based on a collection of indices that reference a second matrix; determining a set of compressed Clifford gates based on the first matrix; applying the set of compressed Clifford gates to a first set of the qubits; and obtaining a set of magic states of the quantum processor as a result of the set of compressed Clifford gates being applied.

In some embodiments, the method includes consuming a set of T states on a second set of the qubits during a first time period, wherein the set of compressed Clifford gates are applied during a second time period subsequent to the first time period.

In some embodiments, the method includes performing a multiqubit Pauli measurement on the plurality of qubits to obtain first Pauli measurement results; and updating a collection of indices based on the multiqubit Pauli measurement results.

In some embodiments, the method includes generating a third matrix and a fourth matrix based on the first matrix, wherein the set of compressed Clifford gates is determined based on the third matrix and the fourth matrix.

In some embodiments of the method, the set of compressed Clifford gates include a set of compressed diagonal Clifford gates. In some embodiments, the first matrix is a symmetric matrix that is generated based on an asymmetric matrix.

The present disclosure also includes a method comprising performing a magic state distillation process for obtaining a set of magic states of a quantum processor, wherein the magic state distillation process includes determining a symmetric matrix based on a plurality of Pauli measurements; generating a compressed diagonal Clifford gate based on the symmetric matrix; and applying the compressed diagonal Clifford gate to a set of qubits of the quantum processor. The method further comprises configuring the quantum processor based on the set of magic states obtained as a result of applying the compressed diagonal Clifford gate.

In some embodiments, the method comprises determining a first matrix and a second matrix based on the symmetric matrix; and generating the compressed diagonal Clifford gate based on the first matrix and the second matrix.

In some embodiments, the method comprises consuming a plurality of T states in the quantum processor, the compressed diagonal Clifford gate being applied subsequent to consumption of the plurality of T states.

In some embodiments, the method includes updating a collection of indices based on the plurality of Pauli measurements, the collection of indices referencing a triorthogonal matrix. The compressed diagonal Clifford gate may be applied in a first number of consumptions in some embodiments, the first number being fewer than the number of columns of the triorthogonal matrix.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

The invention claimed is:

1. A computer system comprising:
a quantum processor including a plurality of qubits;
one or more non-quantum processors; and
a non-transitory computer readable medium having stored thereon program code executable by the one or more non-quantum processors, the program code causing the one or more non-quantum processors to:
generate a first matrix M based on a collection of indices that reference a second matrix H, wherein the second matrix H is a submatrix of a matrix G comprising an $(k+g_0)$-by-n triorthogonal binary matrix and the collection of indices are references to a portion of the matrix G that corresponds to a set of the qubits for which a result tk was obtained that includes (−1) or that does not include (+1) generated based on errors detected in one or more Pauli measurements;
determine a set of compressed Clifford gates based on the first matrix, the compressed Clifford gates comprising compressed diagonal Clifford gates;
apply the set of compressed Clifford gates to a first set of the wherein the set of compressed Clifford gates are collectively applied in a single instance of classical feedback on the set of the plurality of qubits; and
obtain a set of magic states of the quantum processor as a result of the set of compressed Clifford gates being applied, thereby reducing a number of operations involved in magic state distillation.

2. The computer system of claim 1, execution of the program code causing the one or more non-quantum processors to:
perform a multiqubit Pauli measurement on the plurality of qubits to obtain first Pauli measurement results; and
update the collection of indices based on the multiqubit Pauli measurement results.

3. The computer system of claim 1, execution of the program code causing the one or more non-quantum processors to:
perform a set of Pauli measurements on a second set of the qubits to obtain a set of Pauli measurement results;
determine that the set of Pauli measurement results include a defined value; and
update the collection of indices to include an index referencing a portion of the second matrix.

4. The computer system of claim 1, wherein the first matrix is a symmetric matrix that is generated based on an asymmetric matrix.

5. The computer system of claim 1, execution of the program code causing the one or more non-quantum processors to:

perform a plurality of Pauli measurements to obtain a plurality of Pauli measurement results; and consume a set of T states on a set of the qubits, wherein the set of compressed Clifford gates are applied subsequent to consumption of the set of T states.

6. A method performed by one or more non-quantum processors, comprising:

generating a first matrix M based on a collection of indices that reference a second matrix H, wherein the second matrix H is a submatrix of a matrix G comprising an $(k+g_0)$-by-n triorthogonal binary matrix and the collection of indices are references to a portion of the matrix G that corresponds to a set of the qubits for which a result tk was obtained that includes (−1) or that does not include (+1) generated based on errors detected in one or more Pauli measurements;

determining a set of compressed Clifford gates based on the first matrix, the compressed Clifford gates comprising compressed diagonal Clifford gates;

applying the set of compressed Clifford gates to a first set of the qubits wherein the set of compressed Clifford gates are collectively applied in a single instance of classical feedback on the set of the plurality of qubits; and obtaining a set of magic states of the quantum processor as a result of the set of compressed Clifford gates being applied, thereby reducing a number of operations involved in magic state distillation.

7. The method of claim 6, wherein the set of compressed Clifford gates include a set of compressed diagonal Clifford gates.

8. The method of claim 6, wherein the first matrix is a symmetric matrix that is generated based on an asymmetric matrix.

9. The method of claim 6, comprising:

consuming a set of T states on a second set of the qubits during a first time period, wherein the set of compressed Clifford gates are applied during a second time period subsequent to the first time period.

10. The method of claim 6, comprising:

performing a multiqubit Pauli measurement on the plurality of qubits to obtain first Pauli measurement results; and updating a collection of indices based on the multiqubit Pauli measurement results.

* * * * *